United States Patent [19]

Ingemarsson

[11] 4,231,881
[45] Nov. 4, 1980

[54] PULP SCREEN DEVICE

[75] Inventor: Gosta Ingemarsson, Säffle, Sweden

[73] Assignee: Eur-Control Källe AB, Sweden

[21] Appl. No.: 383

[22] Filed: Dec. 29, 1978

[30] Foreign Application Priority Data

Dec. 30, 1977 [SE] Sweden .............................. 7714960

[51] Int. Cl.$^2$ ............................................. B01D 33/02
[52] U.S. Cl. .................................................... 210/396
[58] Field of Search .............. 210/391, 396, 398, 402, 210/77, 79; 209/144, 211

[56] References Cited

U.S. PATENT DOCUMENTS

| | | | |
|---|---|---|---|
| 2,754,967 | 7/1956 | Lykken | 209/144 |
| 3,720,313 | 3/1973 | Lapple | 209/144 |
| 3,972,813 | 8/1976 | Ziolkowski | 210/396 X |
| 4,090,965 | 5/1978 | Fuchs | 210/402 X |

Primary Examiner—William A. Cuchlinski, Jr.
Attorney, Agent, or Firm—Ostrolenk, Faber, Gerb & Soffen

[57] ABSTRACT

A screen device for separating undesirable impurities from a pulp suspension is provided with at least one continuous circular screen slot between a first chamber into which the suspension is conducted and from which undesirable material is removed and a second chamber from which the screen pulp suspension is transported. The slot is formed by two walls which are stationary in relation to each other and a cleaning device such as a doctor or knife bears against the screen slot, the cleaning device and slot being movable in relation to each other for continuous cleaning of the screen slot.

10 Claims, 1 Drawing Figure

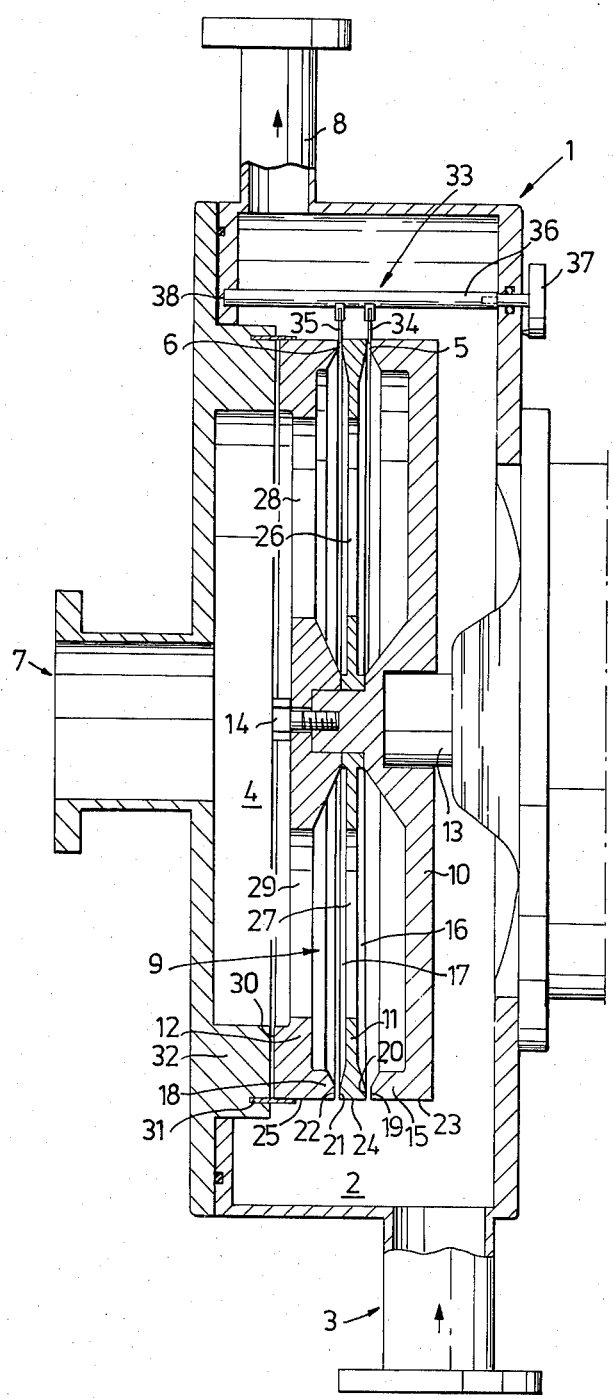

PULP SCREEN DEVICE

This invention relates to screen device for separating undesirable impurities from a pulp suspension, said device is provided with at least one continuous circular screen slot provided between a first chamber into which unfiltered suspension is conducted through an inject-inlet and from which undesirable material is passed away through a reject-outlet and a second chamber, from which screened pulp suspension is transported through an accept-outlet.

In all kinds of pulp production, impurities come from outside as well as from incompletenesses during the production process itself. The impurities must be separated from the pulp suspension before the pulp product is ready for sale. In some cases, the impurities must be separated at a very early stage since they otherwise can cause damages on the equipment. For this separating is used screens and centricleaners. The drawback with these apparatus is generally that they make use of hydraulic principles for the separation which causes only statistical separation, i.e. the main part of the impurities is separated but also relatively large impurities can be accepted though to some extent. Therefore a desire for a long time has been to produce a screen in which the geometric dimensions of the aperture are such that the undesirable impurities cannot pass therethrough. The problem in these cases has been the fact that the capacity becomes so low that the apparatues are not longer of any interest from a technical and economical point of view.

In recent years it has been discovered that a continuous slot, one or both sides of which are movable, has a very large capacity in relation to the dimension of the slot. The cleaning effect is also good owing to the movement of one or both walls of the slot. The reason for the high capacity of a continuous slot in relation to a slot limited in its longitudinal direction is that in the first mentioned case there is no back edge where a gathering of fibres can start and clog the slot. Further, strong contraction does not arise during the flow in the direction of the slot which occurs if the slot has a fixed length. The last mentioned case causes a considerable difference of capacity, especially when big plate thicknesses are used. Screens having one or both walls movable results in very complicated constructions in which great requirements must be made upon the precision of the bearing in the cross section direction of the slot. This makes practical constructions for screening with slot widths of about 0.30 mm practically impossible and screens designed in this way would only seem to be feasible for scrap separating and knot catching.

The present invention provides a screen device of the type described above, by which the mentioned disadvantages are overcome. According to the invention, the screen slot is formed by two walls which are stationary in relation to each other and a cleaning device in the form of a doctor or knife bears against the screen slot, said device and slot are movable in relation to each other for continuous cleaning of the screen slot. Owing to this particles jammed in the screen slot are removed very effectively. The rotation of the cleaning device or those walls forming the slot for most pulp suspensions may be made rather slow and therefore a screen of this type will not require great power. The pulp is fed to the rotating slot from outside, the accept is taken away from the inside of the slot and the reject is passed away from the outside and is fed through an outlet arranged diagonally opposite the inlet. The screen device is advantageously formed so that a slight rotation is attained in order to facilitate the passing away of undesirable material. It can also advantageously be formed in such a way that a pocket for scrap and pebbles is attained. As the hydraulic design does not influence the separating, it need not be given any greater consideration concerning the detail design.

The invention will now be described by way of example with particular reference to the accompanying drawing which shows a vertical section through a screen device according to the present invention.

The illustrated screen device consists of a closed screen apparatus including two screen slots kept clean by aid of knifes. The screen device comprises a casing 1, in which there is a first chamber 2, into which leads an inlet 3 for unscreened pulp suspension and a second chamber 4 receiving that pulp suspension which has passed the screen slots 5 and 6 situated between the chambers 2 and 4 and forwarding the screened suspension through an accept-outlet 7. A reject-outlet 8 is situated diagonally opposite the inlet 3, and through said outlet 8 such material is passed away which cannot pass through the screen slots 5, 6. The screen 9 itself consists of three, in relation to each other, stationary plates 10, 11 and 12, which are fixed to a rotary shaft 13 by a bolt 14. Each plate is formed at the outer periphery of the plates 10, 11, 12 with flange sections 15–18 for constituting walls 19–22 delimiting the screen slots 5 and 6. The innermost plate 10 together with its own and the envelope surfaces 23–25 of the two other plates 11 and 12, said surfaces are aligned in relation to each other, is delimiting the first chamber 2 from the second chamber 4. The screen slots 5 and 6 are formed between the adjacent walls 19–22 of the plates and each slot forms a continuous slot of 360° having an uniform width and a size depending on the type of pulp suspension to be screened. The walls 19–22 are formed so that the screen slot is narrowed at the pressure side of the screen area and widens in a direction towards the filtrate collecting side, whereby a trapezoidal screen slot section is obtained. The inner plate 10 is formed impermeable inside the flange section 15 and in a direction towards the shaft 13, while the two other plates 11 and 12 are provided with openings 26, 27 and 28, 29 between their flange sections 16, 17 and 18 for passage of screened pulp suspension to the second chamber 4. The outer plate 12 is sealed by a sealing means 31 against a flange 32 formed in the casing 1 at the edge 30 which is situated opposite the wall 22 of the flange 18.

In the example illustrated, the slots 5 and 6 are kept clean by a cleaning device 33 in the form of two knives 34 and 35. The knives 34, 35 are fixed to a supporting rod 36 arranged a short distance from the slots 5 and 6 and the envelope surfaces 23–25 of the slots 5 and 6 and in parallel with the shaft 13. The supporting rod 36 is kept in place by a fix screw 37 in one side of the casing 1 and extends through the same and into a recess 38 in the opposite side of the casing 1. The knives 34, 35 extend towards the mouths of the slot and a short distance into the same. In that case a doctor is used, said doctor is provided in the direction of the shaft 13 and bears against the envelope surfaces 23–25. When the width of the slot is small, the knives 34 and 35 are replaced by rotating, saw-toothed knife blades. When the width of the slot is of 1–2 mm, the screen device according to the present invention is used for knot separating, and scrap separating respectively, in pulp production as well as waste paper recovery. In these applications, concentrations of 3–4% will probably be completely capable of being used if the flow is provided in such a way that a network broken down exists in the pulp suspension fed to the screen device. When the width of the slot is of 0.3–0.5 mm the screen device can probably be used for fine screening of pulp mechanical as well as chemical. For coarser qualities as fluting the greater slot width can be interesting while the smaller preferably is usable concerning bleached sulphate pulp and ground pulp respectively. For magazine paper eventually still smaller slot widths can be used.

I claim:

1. A screen device for separating undesirable impurities from a pulp suspension, said device is provided with at least one continuous circular screen slot provided between a first chamber into which suspension to be screened is conducted through an inject-inlet and from which undesirable material is passed away through a reject-outlet, and a second chamber from which screened suspension is forwarded through an accept-outlet, characterized in that the screen slot is formed by two walls stationary in relation to each other and that a cleaning device bears against the screen slot, said cleaning device and slot being movable in relation to each other for continuous cleaning of the screen slot.

2. A device according to claim 1, characterized in that the screen slot extends radially between the two walls from a shaft adapted to bring the walls in rotation.

3. A screen device for separating undesirable impurities from a pulp suspension, said device provided with at least one continuous circular screen slot provided between a first chamber into which suspension to be screened is conducted through an inject-inlet and from which undesirable material is passed away through a reject-outlet and a second chamber from which screened suspension is forwarded through an accept-outlet, characterized in that the screen slot is formed by two walls stationary in relation to each other, the screen slot extending radially between the two walls from a shaft adapted to bring the walls into rotation, one of the walls consisting of an outer edge of a first plate fixed to the rotary shaft and the other wall consisting of an outer edge of a second plate also fixed to the shaft and provided with openings for the accept, the second plate having the same diameter as the first plate, and a cleaning device bearing against the screen slot, said cleaning device and slot being movable in relation to each other for continuous cleaning of the screen slot.

4. A device according to claim 3, characterized in that the opposite outer edge of the second plate is sealed against a flange delimiting the second chamber.

5. A device according to claim 3, characterized in that the envelope surfaces of the plates are aligned in relation to each other.

6. A device according to claim 3, characterized in that the screen slot is most narrow at the pressure side of the screen area and gets wider in a direction towards the filtrate collecting side.

7. A device according to claim 3, characterized in that the slot width is at least 1 mm, the cleaning device consists of a doctor fixed to a supporting rod provided near the screen slot and parallel to the rotating shaft, and said doctor resiliently bears against the screen slot and the envelope surfaces of the plates.

8. A device according to claim 3, characterized in that the slot width is 0.3–1 mm, and the cleaning device consists of a rotatable knife blade fastened above the slot to a supporting rod.

9. A device according to claim 3 characterized in that a third plate provided with openings for the accept and of the same diameter as said first and second plates is fixed to the rotary shaft between said walls and is stationary in relation to each of said walls.

10. A device according to claim 3 characterized in that the slot width is at least 1 mm, and the cleaning device is at least one knife fixed to a supporting rod in front of the slot and extending into the slot.

* * * * *